(No Model.)
W. D. MILLER.
HORSE HAY RAKE.
No. 348,230. Patented Aug. 31, 1886.
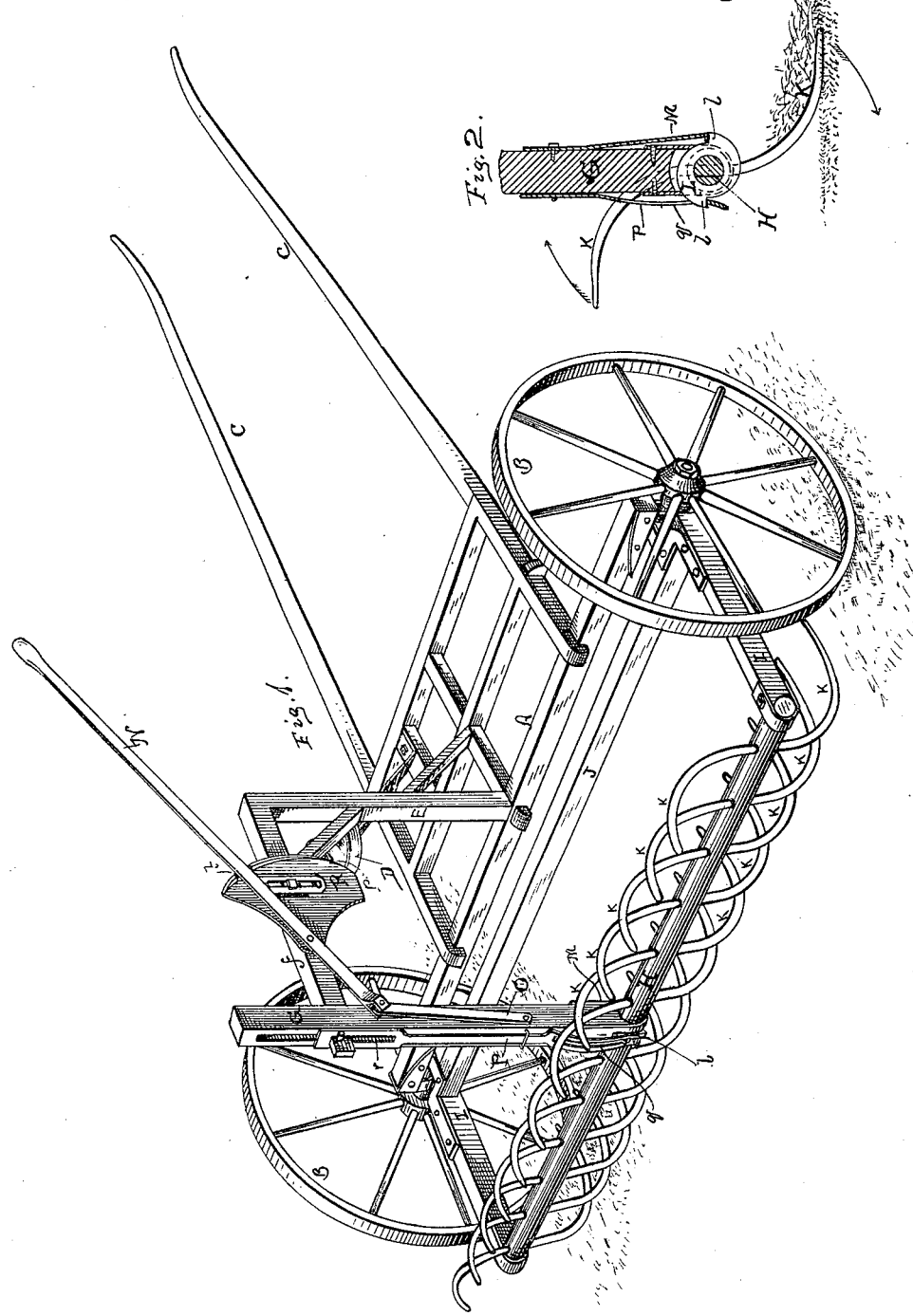
Witnesses:
N. B. Smith
J. C. Huntemann
Inventor:
W. D. Miller
By R. D. Smith
atty

United States Patent Office.

WILLIAM D. MILLER, OF SPRINGFIELD, OHIO.

HORSE HAY-RAKE.

SPECIFICATION forming part of Letters Patent No. 348,230, dated August 31, 1886.

Application filed July 6, 1885. Serial No. 170,829. (No model.)

*To all whom it may concern:*

Be it known that I, WILLIAM D. MILLER, of Springfield, in the county of Clark and State of Ohio, have invented new and useful Improvements in Horse Hay-Rakes; and I do hereby declare that the following is a full and accurate description of the same.

My invention relates to that class of revolving horse-rakes wherein there is a rake-shaft attached to the main frame or axle by a supplemental frame which is hinged to the main frame or axle, and capable of being moved so as to raise or lower the rake-shaft to permit the rake to revolve, or to raise it free from the ground for transportation, &c., and curved teeth projecting downward and forward from said rake-shaft, so as to rest with their backs upon the ground and their points parallel thereto. Heretofore, so far as I am aware, revolving rakes of this class have been provided with latches to restrain the rake-shaft from revolving on its axis; but my invention differs therefrom, because the supplemental frame is locked, instead of the rake-shaft, and therefore the rake cannot revolve without raising from the ground the entire weight of the wheel-carriage and driver. It is much easier to lock the supplemental frame than to lock the rake-shaft by devices necessarily placed close to the axis of revolution.

That others may fully understand my improvement, I will particularly describe it, having reference to the accompanying drawings, wherein—

Figure 1 is a perspective of my rake. Fig. 2 is a longitudinal vertical section of the same.

A is the main axle, supported at its ends by the wheels B B. The shafts C C serve for the attachment of the draft-horse and to support the platform for the driver's seat D. These parts are made and arranged as usual.

A gallows-frame post, E, is mounted upon the axle and strongly braced thereon. Its horizontal arm $f$ overhangs toward the rear and supports at its extremity the pendent arm G, which is fitted to slide up and down on the arm $f$. At its lower end the arm G is provided with a suitable bearing for the center of the rake-shaft H, the ends of which turn in suitable bearings at the extremities of the arms I I, whose forward ends are hinged to the axle A. For convenience I attach to the forward ends of the arms I I a girt, J, and said girt, together with the arms I I and the rake-shaft H, constitute a supplemental or dragging frame which carries the rake.

The rake-shaft H is provided with curved teeth K, which, when in action, curve downward and forward from said shaft, so that their points lie horizontally upon the ground, and the back of each tooth for some little distance from its point rests and slides upon the ground, and in this position, as the rake advances the points of the teeth slide under the hay and gather it against the upper and forward sides of the teeth and rake-shaft. In the position described the weight of the rake-shaft and arms I I, together with the weight of the arm G, rests upon the rake-teeth and ground, and as this weight is imposed at a distance in rear of the point of support upon the ground, it follows that the rake-shaft would sink toward the ground and cant the points of the teeth upward therefrom if not restrained, and such restraint I find it convenient to apply by means of a ratchet or latch-ring, L, secured to the rake-shaft H. Said ratchet is provided with two teeth, $l$, and one of them engages with the spring-latch M, which prevents any rotation of the rake-shaft under the influence of the weight of the parts named; but when the proper quantity of hay has been gathered by the rake-teeth it is dumped by raising the rake-shaft so that the points of the teeth will catch in the sod, and to prevent the necessity of a complete revolution before bringing the teeth into action again I provide the rake-shaft H with a second set of teeth, K, opposite the first, as is usual with rakes of this class.

In order to raise the rake when it is desired to dump its load, I pivot a lever, N, to the arm $f$, and arrange it so that its forward or handhold end is within convenient reach of the driver. Its rear end is connected with the arm G by a link, O, or other proper and convenient means, so that by pulling the forward end of said lever downward the rake-shaft will be pulled upward, and the weight of the hay upon the teeth will insure their engagement with the sod and the discharge of the load; but the momentum of the revolving teeth cannot be relied on to carry the opposite set far enough over to gather a new lot of hay, and I therefore place upon the rear side of the arm G a bar-slide, P, which has a long slot, $q$, in its lower end, and is thus adapted to engage one of the teeth $l$ of the ratchet L as the rake-shaft descends again, and force it to revolve far enough for a proper engagement of the latch M. To do this it is necessary that the bar-slide P shall have a less range of reciprocation than the arm G, which carries it, and I therefore provide its upper end with a long slot, $r$, through which, for convenience, I cause the rear end of the arm $f$ to pass, and attach said slide to the rear side of arm G by means of guide-clips, within which it has a free longitudinal motion. Thus said slide is arrested by the arm $f$ before the arm G is arrested. Thus, when the arm F is raised to discharge the hay the slide P may move with it a distance, and is then arrested by the arm $f$, while said arm G continues. The ratchet-teeth $l$ are thereby carried toward the upper end of the slot $q$. When the arm G descends again, it moves farther than the slide P, and one or another of the ratchet-teeth $l$ passes downward in said slot $q$, and, being arrested by the lower end thereof, compels the rake-shaft to complete its revolution.

It is convenient to connect the arm $f$ and the arm G by means of a tenon on the extremity of arm $f$ and a long slot in arm G. Said tenon penetrates said slot, and is secured against detachment by a pin, and the arm G is thereby free to move up and down on said tenon.

A latch-plate or keeper, R, is attached to some convenient part of the gallows-frame to hold the lever N in the desired position, either up or down. When said lever is in the lower hold, $r$, the rake is supported above the ground, and clear thereof. When said lever is in the upper hold, $t$, then the rake-shaft is forced and held down, and the rake cannot revolve without raising the whole supplemental and sulky frames. The keeper R should be made adjustable on the gallows-frame, and the height to which the rake may be raised can thereby be made adjustable also.

Having described my invention, what I claim as new is—

1. In a horse hay-rake, a main axle or frame mounted upon wheels, and provided with a gallows-frame composed of the post E and arm $f$, mounted on said axle, and a supplemental or dragging frame hinged to said axle at its front edge, and carrying the rake-shaft at its rear edge, combined with the suspending-arm G, controlling-lever N, and a lock or keeper for the same, substantially as set forth.

2. The rake-shaft H, attached to the main frame or axle A by the dragging arms or frame I, and provided with the ratchet-disk L, combined with the suspending-arm G, latch M, attached thereto, and adapted to engage said ratchet and restrain the rake from revolving backward, the lever N, whereby the rake-shaft may be raised or lowered, and a lock or keeper for said lever, substantially as set forth.

3. The rake-shaft H, adapted to revolve in bearings carried by the dragging frame I, and suspended from the main frame by the lever N, combined with the ratchet-disk L and the latch M, and the bar-slide P, having a less range of motion than the rake-shaft, and adapted to engage said ratchet L and compel the rake to complete its rotation as it descends to the ground, as set forth.

4. In a horse hay-rake, a main frame or axle, A, supported upon wheels B, and provided with the post E and horizontal arm $f$, strongly braced, the arm $f$ having a long tenon at its rear end, combined with the pendent arm G, having a long slot fitted over said tenon, and free to slide up and down thereon, the rake-shaft H and dragging frame attached to the lower end of said post, and the lever N, provided with a keeper, whereby the rake-shaft may be raised and lowered, as set forth.

WM. D. MILLER.

Witnesses:
E. O. HAGAN,
F. M. HAGAN.